United States Patent
Kaimai et al.

[11] Patent Number: 6,153,133
[45] Date of Patent: Nov. 28, 2000

[54] METHOD OF PRODUCING HIGHLY PERMEABLE MICROPOROUS POLYOLEFIN MEMBRANE

[75] Inventors: Norimitsu Kaimai; Kotaro Takita; Koichi Kono; Hidehiko Funaoka, all of Kanagawa-ken, Japan

[73] Assignee: Tonen Chemical Corporation, Tokyo, Japan

[21] Appl. No.: 09/331,649

[22] PCT Filed: Sep. 21, 1998

[86] PCT No.: PCT/JP98/04241

§ 371 Date: Jun. 23, 1999

§ 102(e) Date: Jun. 23, 1999

[87] PCT Pub. No.: WO99/21914

PCT Pub. Date: May 6, 1999

[30] Foreign Application Priority Data

Oct. 23, 1997 [JP] Japan ................................. 9-309267
Oct. 23, 1997 [JP] Japan ................................. 9-309280

[51] Int. Cl.[7] .......................... B29C 47/78; B29C 55/04; B29C 67/20
[52] U.S. Cl. ................. 264/41; 264/210.4; 264/210.5; 264/211.19; 264/235.6
[58] Field of Search ............................ 264/41, 154, 203, 264/210.4, 210.5, 211.19, 235.6, 288.8

[56] References Cited

U.S. PATENT DOCUMENTS

| | | | |
|---|---|---|---|
| 5,683,634 | 11/1997 | Fujii et al. | 264/41 |
| 5,853,633 | 12/1998 | Kono et al. | 264/41 X |

FOREIGN PATENT DOCUMENTS

| | | |
|---|---|---|
| 60-242035 | 2/1985 | Japan . |
| 61-195132 | 8/1986 | Japan . |
| 61-195133 | 8/1986 | Japan . |
| 63-39602 | 2/1988 | Japan . |
| 63-273651 | 10/1988 | Japan . |
| 9-31226 | 2/1997 | Japan . |
| 9-87413 | 3/1997 | Japan . |

*Primary Examiner*—Leo B. Tentoni
*Attorney, Agent, or Firm*—Sughrue, Mion, Zinn, Macpeak & Seas, PLLC

[57] ABSTRACT

A method for producing a highly permeable microporous polyolefin membrane including the steps of preparing a polyolefin solution containing 5–40 weight % of a polyolefin or a polyolefin composition and 95–60 weight % of a solvent, the polyolefin having a weight-average molecular weight of not less than $3\times10^5$ and less than $1\times10^6$ and a weight-average molecular weight/number-average molecular weight of 5–300, and the polyolefin composition having a weight-average molecular weight of not less than $3\times10^5$ and less than $1\times10^6$ and a weight-average molecular weight/number-average molecular weight of 5–300 as a whole, extruding the polyolefin solution, stretching the extrudate uniaxially at a draft ratio of 3–50 in a molten state, cooling the stretched extrudate to solidify to a gel-like sheet, removing residual solvent, drying the resultant sheet, and heat-setting at a temperature of 80° C. or higher and its melting point or lower. A polyolefin or its composition is uniaxially stretched before it is cooled to a gel-like sheet. Uniaxial stretching of a viscous polyolefin solution allows micropores to have a large average diameter, thereby improving permeability of the microporous polyolefin membrane and accelerating production.

6 Claims, 1 Drawing Sheet

METHOD OF PRODUCING HIGHLY PERMEABLE MICROPOROUS POLYOLEFIN MEMBRANE

FIELD OF THE INVENTION

The present invention relates to a method of producing a microporous polyolefin membrane, particularly to a method of producing a highly permeable microporous polyolefin membrane.

BACKGROUND OF THE INVENTION

Microporous polyolefin membranes are widely used in various applications such as battery separators, electrolytic capacitor separators, various filters, moisture-permeable, waterproof clothes, reverse osmosis membranes, ultrafiltration membranes, microfiltration membranes, etc.

It has been known in the art that the microporous membrane may be produced by forming a molten mixture of a polyolefin, an organic solvent and inorganic powder such as silica fine powder into a sheet, and extracting the organic solvent and the inorganic powder from the sheet. However, because the inorganic powder should be extracted in this method, it is difficult to adjust the permeability of the resultant microporous membrane, which largely depends on the particle size of the inorganic powder, to a desired level.

Various methods of producing a microporous membrane from an ultra high-molecular-weight polyolefin have been recently proposed in Japanese Patent Laid-Open Nos. 60-242035, 61-195132, 61-195133, 63-39602, 63-273651, etc. In these methods, a solution prepared by dissolving an ultra high-molecular-weight polyolefin having a weight-average molecular weight of $7 \times 10^5$ or more in a non-volatile solvent while heating is formed into a gel-like sheet, whose non-volatile solvent content is adjusted by removing part of the non-volatile solvent. The gel-like sheet is then stretched while heating, and the residual non-volatile solvent is removed from the stretched sheet by extraction to produce the microporous membrane.

In the methods mentioned above, a large number of fine pores are formed by stretching the gel-like sheet after solidification by cooling. Therefore, the microporous membrane produced by these methods is characterized by a small pore size and a narrow pore size distribution. However, these methods fail to provide microporous polyolefin membranes having relatively large pore sizes and high permeability suitable for high-precision filtration membranes, battery separators, etc.

In such circumstances, the inventors found that a microporous polyolefin membrane having excellent permeability can be produced by preparing a solution of a polyolefin composition comprising ultra high-molecular-weight components, extruding the solution through a die lip of an extruder into a sheet, rapidly cooling the extruded sheet to form a gel-like sheet, and removing the residual solvent therefrom preferably without stretching. However, because the polyolefin composition has a high weight-average molecular weight, it is difficult to prepare a high-concentration polyolefin composition solution for forming the gel-like sheet. Thus, this method takes too much time to produce the microporous membrane, posing poor production efficiency. Further, the gel-like sheet is likely to have unsatisfactory surface conditions, with poor formability.

Accordingly, an object of the present invention is to provide a method of easily and efficiently producing a microporous polyolefin membrane having a relatively large pore size and excellent permeability.

DISCLOSURE OF THE INVENTION

As a result of research in view of the above object, the inventors have found that a microporous polyolefin membrane having excellent permeability can be produced fast and efficiently by preparing a solution of a polyolefin or a polyolefin composition having a molecular weight in a particular range in an extruder, extruding the solution through a die lip of an extruder into a sheet, drawing the extruded sheet by pull rolls to uniaxially stretch it in a molten state, cooling the stretched sheet, and removing the residual solvent from the stretched sheet, and then drying and heat-setting it. The present invention has been accomplished by this finding.

Thus, the method of producing a microporous polyolefin membrane according to the present invention comprises the steps of:

preparing a polyolefin solution comprising 5–40 weight % of a polyolefin or a polyolefin composition and 95–60 weight % of a solvent, the polyolefin having a weight-average molecular weight of not less than $3 \times 10^5$ and less than $1 \times 10^6$ and a weight-average molecular weight/number-average molecular weight of 5–300, and the polyolefin composition having a weight-average molecular weight of not less than $3 \times 10^5$ and less than $1 \times 10^6$ and a weight-average molecular weight/number-average molecular weight of 5–300 as a whole;

extruding the polyolefin solution;

uniaxially stretching the extruded polyolefin solution in a molten state at a draft ratio of 3–50;

cooling the stretched polyolefin solution to solidify to a gel-like sheet;

removing a residual solvent from the gel-like sheet and drying the resultant sheet; and heat-setting the sheet at a temperature of 80° C. or higher and its melting point or lower.

BEST MODE FOR CARRYING OUT THE INVENTION

[1] Starting materials

Figure 1:
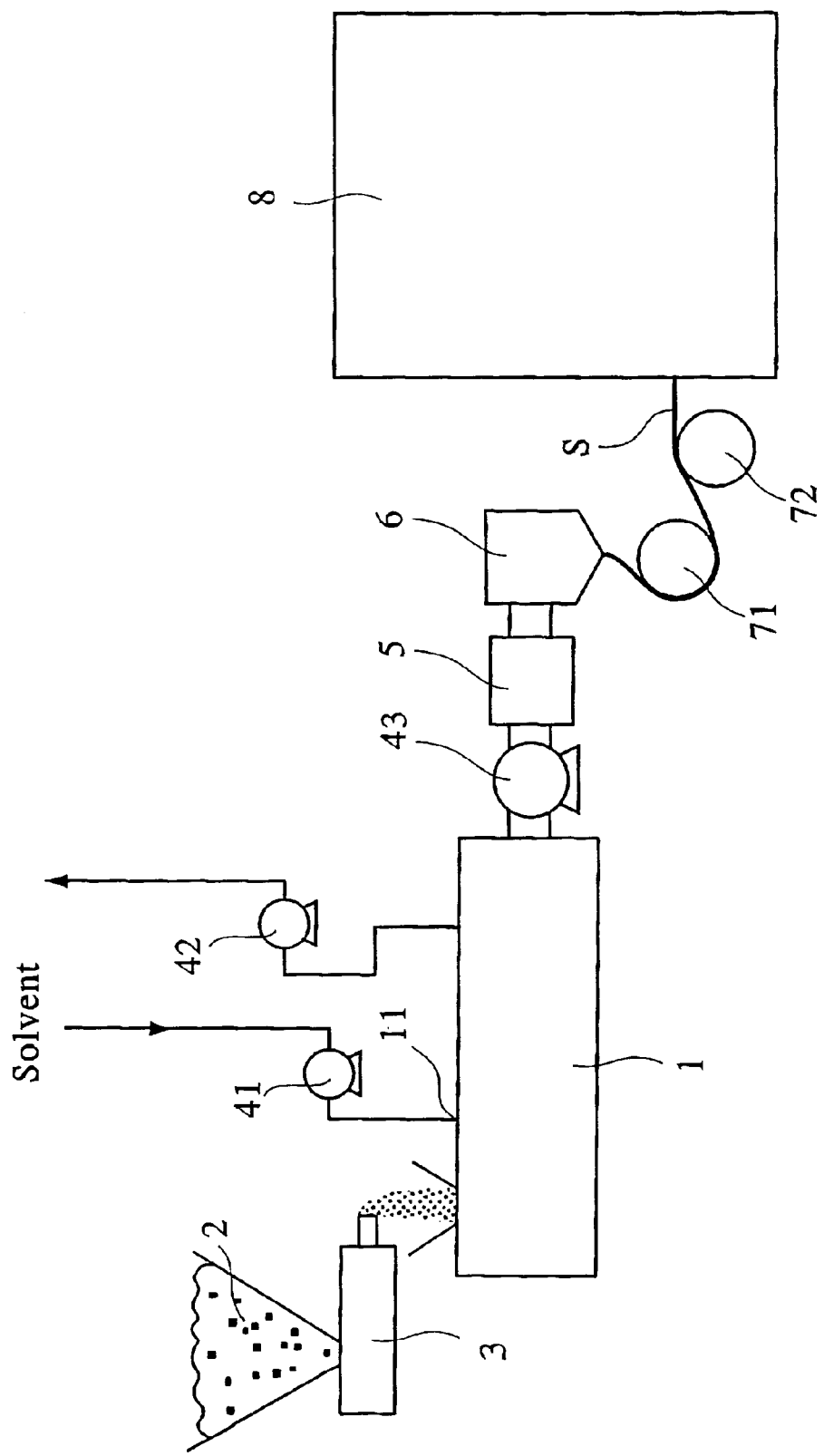
FIG. 1 is a schematic view showing an example of an apparatus for producing the highly permeable, microporous polyolefin membrane of the present invention.

Used as a material of the microporous polyolefin membrane of the present invention is a polyolefin or a polyolefin composition containing two or more polyolefins having different weight-average molecular weights. The polyolefin should have a weight-average molecular weight from $3 \times 10^5$ to less than $1 \times 10^6$ and a weight-average molecular weight/number-average molecular weight (hereinafter referred to simply as "Mw/Mn") of 5–300. Also, the polyolefin composition should have a weight-average molecular weight from $3 \times 10^5$ to less than $1 \times 10^6$ and Mw/Mn of 5–300 as a whole.

(a) Polyolefin used alone

When only one polyolefin is used, it has a weight-average molecular weight of $3 \times 10^5$ to less than $1 \times 10^6$. Such polyolefins may be crystalline homopolymers or copolymers of ethylene, propylene, 1-butene, 4-methyl-1-pentene, 1-hexene, etc. Preferable among them is polyethylene, particularly a high-density polyethylene. The polyolefin preferably has a weight-average molecular weight of $5 \times 10^5$ to $8 \times 10^5$. When a polyolefin having a weight-average molecular weight of less than $3 \times 10^5$ is used alone, the resultant polyolefin solution has a decreased viscosity, not only deteriorating the formability of the polyolefin solution, but also increasing the proportions of low-molecular-weight components thereby providing the resultant microporous polyolefin membrane with poor permeability.

A ratio of weight-average molecular weight/number average molecular weight (Mw/Mn) is a parameter representing a molecular weight distribution. The larger the Mw/Mn is, the wider the molecular weight distribution is. The Mw/Mn of the polyolefin used alone is 5–300, preferably 10–50. The Mw/Mn larger than 300 leads to an undesirably large low-molecular-weight component content, reducing the pore size and thus permeability of the resultant microporous polyolefin membrane. However, it is practically difficult to obtain a polyolefin having Mw/Mn of less than 5 without special separation treatment.

(b) Polyolefin composition

The polyolefin composition contains 2 or more polyolefins each having a weight-average molecular weight of $1 \times 10^4$ to $6 \times 10^6$, preferably $3 \times 10^5$ to $3 \times 10^6$. These polyolefins are formulated such that the polyolefin composition has a weight-average molecular weight of $3 \times 10^5$ to less than $1 \times 10^6$, preferably $5 \times 10^5$ to $8 \times 10^5$, and Mw/Mn of 5–300 as a whole. When a polyolefin having a weight-average molecular weight of less than $1 \times 10^4$ is used as a component of the polyolefin composition, the extruded polyolefin solution is often broken when stretched in a molten state, failing to obtain a good microporous polyolefin membrane. The upper limits of weight-average molecular weights of commercially available polyolefins are generally up to about $6 \times 10^6$.

Polyolefins contained in the polyolefin composition may be 2 or more crystalline homopolymers or copolymers of ethylene, propylene, 1-butene, 4-methyl-1-pentene, 1-hexene, etc. Also usable as the polyolefin composition are a polyolefin produced by a multi-stage polymerization method such as a reactor blend method, in which olefins are multi-stage polymerized in the same reactor to continuously prepare low-molecular-weight components and high-molecular-weight components.

The polyolefin composition has an Mw/Mn ratio of 5–300, preferably 10–50. In the polyolefin composition composed of a plurality of polyolefins having different weight-average molecular weights, the larger the Mw/Mn, the larger the difference in weight-average molecular weight between the polyolefins, and vice versa. The Mw/Mn larger than 300 leads to an undesirably high content of low-molecular-weight components, thereby reducing the permeability of the resultant microporous polyolefin membrane. On the other hand, when the Mw/Mn is less than 5, the gel-like sheet is not well formable.

(c) Other components

The polyolefin or its composition may further contain, if desired, various additives such as antioxidants, ultraviolet absorbers, anti-blocking agents, pigments, dyes, inorganic fillers, etc. in such amounts as not to affect the effects of the present invention.

[2] Production of microporous polyolefin membrane

Because the production conditions of the microporous polyolefin membrane are not essentially different between a case where only one polyolefin is used and a case where a polyolefin composition is used, detailed explanations of the method of the present invention will be made below in the case of using the polyolefin alone referring to FIG. 1.

(1) Dissolving polyolefin while heating

The polyolefin solution is prepared by dissolving the polyolefin or its composition in a solvent while heating. The solvent may be an aliphatic, alicyclic or aromatic hydrocarbon such as nonane, decane, decalin, p-xylene, undecane, dodecane, liquid paraffin, etc., and a mineral oil distillate having a boiling point comparable to those of the above hydrocarbons. Because the solvent is not vaporized when extruded through a die lip of an extruder, it is referred to as "non-volatile solvent" hereinafter.

The viscosity of the non-volatile solvent is preferably 30–500 cSt, more preferably 50–200 cSt at 25° C. When the viscosity of the non-volatile solvent is less than 30 cSt at 25° C., extrusion through a die lip is not uniform, failing to produce a uniform sheet. On the other hand, when the non-volatile solvent has a viscosity higher than 500 cSt, it cannot easily be removed in the subsequent solvent removal step.

The polyolefin is dissolved in the non-volatile solvent by (A) stirring at such a temperature that the polyolefin is completely dissolved in the non-volatile solvent, or (B) uniformly melt-blending the polyolefin and the non-volatile solvent in an extruder In the case of the method (A), how high the heating temperature is depends on the types of the polyolefins and the non-volatile solvents used, and it is preferably 140 to 250° C., for example, in the case of polyethylene/liquid paraffin.

The method (B) is suitable for preparing a highly concentrated polyolefin solution. When the polyolefin is dissolved in the solvent while heating in an extruder, the polyolefin is first charged into the extruded and melt-blended. In an apparatus shown in FIG. 1, polyolefin powder 2 is quantitatively fed through a feeder 3 into a double-screw extruder 1, and melt-blended in the extruder 1. The melt-blending temperature is preferably between the melting temperature of the polyolefin +30° C. and the melting temperature of the polyolefin +100° C., though it may vary depending on the type of the polyolefin. For example, the melt-blending temperature is preferably 160–230° C., more preferably 170–200° C. for polyethylene, and preferably 190–270° C., more preferably 190–250° C. for polypropylene.

A non-volatile solvent is added to the molten polyolefin in a halfway of the extruder 1, for example, through a pump 41 and a side feeder 11. Their mixing ratio is such that the polyolefin is 540 weight %, preferably 10–30 weight %, and that the non-volatile solvent is 60–95 weight %, preferably 70–90 weight %, each based on the total amount of the polyolefin and the non-volatile solution. When the polyolefin is less than 5 weight % (when the non-volatile solvent exceeds 95 weight %), swelling and neck-in occur at the die exit through which the molten polyolefin solution is extruded, resulting in decrease in formability of the extrudate into a gel-like extrudate (gel-like sheet), and the resultant gel-like extrudate is not fully self-supported. On the other hand, when the polyolefin is more than 40 weight % (when the non-volatile solvent is less than 60 weight %), the extruded sheet excessively shrinks in the thickness direction, resulting in providing a microporous polyolefin membrane with a small porosity and a small pore size. Additionally, the formability of the gel-like sheet is deteriorated. The permeability of the resultant microporous polyolefin membrane can be controlled by changing the mixing ratio of the polyolefin and the non-volatile solvent within the above range.

(2) Extrusion and stretching of polyolefin solution while melting

The hot solution of polyolefin/non-volatile solvent prepared by melt-blending in the extruder is extruded through a die lip immediately, or after once cooled and pelletized. The die lip used is usually a sheet die having a rectangular-cross section orifice, though a double-cylindrical hollow die lip having a circular orifice, an inflation die lip, etc. may also be used. In the case of the sheet die, its die gap is usually 0.1 to 5 mm, and it is heated at 140–250° C. during extrusion.

The viscous polyolefin solution extruded thorough the die lip in a sheet shape is drawn and cooled by rolls 71 and 72 cooled by a coolant as shown in FIG. 1, to form a gel-like sheet S. Before the extruded sheet comes into contact with the cooling roll 71, namely before it is cooled to solidify to a gel-like sheet, it is stretched in one direction still in a molten state. As a result, not only the resultant microporous polyolefin membrane is provided with increased average pore diameter and thus improved permeability, but also are the production speed of the membranes and its productivity greatly improved.

The draft ratio (=cross section area of die lip orifice/cross section area of gel-like sheet) is 3–50, preferably 5–20. When the draft ratio is less than 3, the average pore diameter of the resultant microporous polyolefin membrane is too small, providing insufficient permeability. On the other hand, when the draft ratio exceeds 50, micropores of the sheet is likely to be occluded, resulting in decrease in permeability. The draft ratio is adjusted by changing the orifice size of the die lip, the pulling speed of the sheet, and the extrusion speed of the viscous polyolefin solution. The pulling speed of the sheet is 20 cm/minute–15 M/minute, preferably 3–10 n/minute. When the pulling speed of the sheet is less than 20 cm/minute, the draft ratio is too low, resulting in insufficient stretching. On the other hand, when the pulling speed exceeds 15 m/minute, the draft ratio is too high, resulting in neck-in and decrease in permeability of the resultant microporous polyolefin membrane.

Until the uniaxial stretching of the extruded viscous polyolefin solution is completed, namely until the stretched sheet of the viscous polyolefin solution comes into contact with the cooling roll 71, the extruded viscous polyolefin solution is preferably maintained in a molten state, in other words, kept at least at a temperature over the melting point of the polyolefin. When frost lines are generated in the sheet by too rapid cooling before it touches the cooling roll 71, or when the viscous polyolefin solution sheet is stretched after gelation starts, the resultant microporous polyolefin membrane is provided with small pore size and thus low permeability.

The distance between the die lip and the cooling roll 71, namely the distance that the viscous polyolefin solution moves from extrusion through the die lip to a point at which it comes into contact with a surface of the cooling roll 71, is 5–100 mm, preferably 10–50 mm. If the polyolefin solution has a low viscosity, the above distance is preferably short because if otherwise the resultant sheet would be likely to suffer neck-in. The temperature of the cooling rolls 71 and 72 is from 30° C. to the crystallization temperature of the polyolefin, preferably 40–90° C. When the cooling rolls have too high a temperature, the sheet is cooled too slowly after brought into contact with the cooling rolls, making thicker a wall having a lamellar structure of the polyolefin to form a gel-like structure. As a result, the micropores are likely to become independent from each other, hindering the solvent from being removed, and decreasing the permeability of the sheet. On the other hand, when the cooling rolls have too low a temperature, the sheet is cooled too rapidly after brought into contact with the cooling rolls, making the gel-like structure too dense. As a result, the resultant microporous polyolefin membrane has too small pore diameter, resulting in low permeability.

The thickness of the gel-like sheet is preferably 10–300 $\mu$m.

When the thickness is less than 10 $\mu$m, the strength of the gel-like sheet is not sufficient, making it difficult to form the sheet. On the other hand, when the thickness exceeds 300 $\mu$m, the gel-like sheet is not fully self-supported, and the resultant microporous polyolefin membrane has small porosity and low permeability, making it difficult to remove the non-volatile solvent.

(3) Washing, drying and heat-setting

After cooling the stretched gel-like sheet, the residual non-volatile solvent is removed therefrom by washing with a volatile solvent. The volatile solvents usable for washing the stretched gel-like sheet may be hydrocarbons such as pentane, hexane, heptane, etc.; chlorinated hydrocarbons such as methylene chloride, carbon tetrachloride, etc.; fluorinated hydrocarbons such as trifluoroethane, etc.; and ethers such as diethyl ether, dioxane, etc. These volatile solvents may be used alone or in combination, and selected depending on the types of the non-volatile solvents. Washing methods include a method of extracting the residual solvent by immersing the stretched gel-like sheet in the volatile solvent, and a method of spraying the volatile solvent onto a surface of the stretched gel-like sheet, and these methods may be combined. The washing should be continued until the residual solvent content in the gel-like sheet becomes less than 1 weight %. Thereafter, the volatile solvent is removed by heating, air drying, etc. The temperature, time and atmosphere in the washing and drying processes may be determined according to known methods.

The dried gel-like sheet is then heat-set at a temperature of 80° C. or higher and its melting point or lower, preferably at 110–130° C. for 5 seconds to 10 minutes. In gel-like sheet walls constituted by one to several layers of polyolefin lamella, heat setting stabilizes polyolefin crystals and makes the lamellar structure uniform. Thus, the percentages of small-diameter pores become smaller, and the average pore diameter becomes slightly larger, resulting in further increase in permeability. Also, the heat setting turns a broad pore size distribution sharp and narrow, and makes the pore size uniform.

[3] Microporous polyolefin membrane

The microporous polyolefin membrane thus produced is a highly permeable membrane having a permeability of preferably 100 second/100 cc or less, more preferably 70 second/100 cc or less, particularly 5–50 second/100 cc, a porosity of 35–95%, an average pore diameter (average diameter of through-holes) of 0.05–1 $\mu$m, preferably 0.1–0.5 $\mu$m. The thickness of the microporous polyolefin membrane may be adjusted depending on its applications, though it is generally 5–250 $\mu$m, preferably 20–200 $\mu$m.

If necessary, the microporous polyolefin membrane is provided with hydrophilic properties by plasma irradiation, impregnation with surfactants, surface grafting, etc.

The present invention will be described in detail below by way of Examples, though the present invention should not be limited thereto.

EXAMPLES 1–7

Comparative Examples 1–7

A microporous polyethylene membrane was produced by the apparatus as shown in FIG. 1. 100 parts by weight of polyethylene or its composition (hereinafter referred to simply as "polyethylene") as shown in Table 1 was dry-blended with 0.375 parts by weight of an antioxidant, and supplied through a feeder 3 to a double-screw extruder 1

(internal diameter=58 mm, L/D=42, strong kneading-type). A liquid paraffin (135 cSt/25° C.) was introduced at such an amount as to give a polyethylene concentration shown in Table 1 into the double-screw extruder 1 by a pump 41 through the side-feeder 11. The inside of the double-screw extruder was evacuated by a vacuum pump 42 to prevent the air from enter. The resultant mixture was melt-blended at 200° C. and 200 rpm to produce a polyethylene solution.

After removing impurities by a strainer 5, the polyethylene solution was extruded in an amount adjusted by a gear pump 43 through a T-die 6 (die lip size: 0.2–0.6 mm, and die lip width: 550 mm) installed at a tip end of the extruder 1, in the form of a sheet. The extruded sheet-shaped viscous polyethylene solution was pulled by two cooling rolls 71 and 72 at 80° C. to carry out uniaxial stretching in a molten state. The stretched sheet was then cooled by the cooling rolls 71 and 72 to solidify to a gel-like sheet S. The distance between the die 6 and the cooling roll 71 was 10 mm, and the pulling speed of the sheet was adjusted to 3–10 m/minute to achieve a draft ratio shown in Table 1. The resultant gel-like sheet S was conveyed into a chamber 8, in which it was washed with methylene chloride to remove the residual liquid paraffin, dried and then heat-set at 125° C. to produce a microporous polyethylene membrane.

The weight-average molecular weight Mw and the Mw/Mn of polyethylene, its formability into a sheet, and properties of the resultant microporous polyethylene membrane were measured by the following methods. The results are as shown in Table 1.

(1) Weight-average molecular weight Mw, and Mw/Mn

The molecular weight distribution of polyethylene was measured by a gel-permeation chromatograph (GPC) of Waters Inc. having a column of GMH-6 available from Tosoh Corporation, using o-dichlorobenzene as a solvent at 135° C. and at a flow rate of 1.0 ml/minute. Obtained from the measurement results were weight-average molecular weight Mw, number-average molecular weight Mn, and Mw/Mn.

(2) Formability into sheet

With respect to the formability into a sheet, observation was conducted by the naked eye on swelling, neck-in and melt fracture at the time of forming a sheet, extrudability and uniformity of the molten polyethylene solution from the extruder, uniformity of extrusion speed and smoothness of the sheet surfaces (surfaces of the viscous sheet-shaped polyethylene solution and the gel-like sheet), and evaluation was made according to the following criteria:

Good: Good results in all tests,

Fair: Unsatisfactory results in some tests, and

Poor: Unsatisfactory in all or almost all tests.

(3) Properties of microporous polyethylene membrane

The properties of the microporous polyethylene membrane were measured by the following methods.

(a) Thickness:

The cross-section of the membrane was observed by a scanning electron microscope.

(b) Porosity:

Measured by a weighing method (unit: %).

(c) Air permeability:

Measured according to JIS P 8117 (unit: second/100 cc).

(d) Average pore diameter (average diameter of through-holes):

Measured by a Coulter porometer II available from Coulter Inc. (unit: $\mu$m).

TABLE 1

| | EXAMPLE | | | |
|---|---|---|---|---|
| | 1 | 2 | 3 | 4 |
| Polyethylene (weight %) | | | | |
| Polyethylene 1[(1)] | 0 | 0 | 10 | 15 |
| Polyethylene 2[(2)] | 100 | 0 | 90 | 0 |
| Polyethylene 3[(3)] | 0 | 100 | 0 | 85 |
| Polyethylene 4[(4)] | 0 | 0 | 0 | 0 |
| Mw (×10$^5$) | 7.8 | 3.0 | 9.1 | 7.0 |
| Mw/Mn[(5)] | 6 | 11 | 12 | 16 |
| Concentration of solution (weight %) | | | | |
| Polyethylene | 20 | 20 | 20 | 20 |
| Liquid Paraffin | 80 | 80 | 80 | 80 |
| Draft Ratio[(6)] | 10 | 9 | 10 | 11 |
| Formability into Sheet[(7)] | Good | Good | Good | Good |
| Properties of Microporous Polyethylene Membrane | | | | |
| Thickness ($\mu$m) | 45 | 50 | 46 | 42 |
| Porosity (%) | 70 | 68 | 70 | 71 |
| Air Permeability[(8)] | 16 | 20 | 14 | 13 |
| Average Pore Diameter[(9)] | 0.49 | 0.41 | 0.55 | 0.56 |

| | EXAMPLE | | |
|---|---|---|---|
| | 5 | 6 | 7 |
| Polyethylene (weight %) | | | |
| Polyethylene 1[(1)] | 15 | 15 | 15 |
| Polyethylene 2[(2)] | 0 | 0 | 0 |
| Polyethylene 3[(3)] | 85 | 85 | 85 |
| Polyethylene 4[(4)] | 0 | 0 | 0 |
| Mw (×10$^5$) | 7.0 | 7.0 | 7.0 |
| Mw/Mn[(5)] | 16 | 16 | 16 |
| Concentration of solution (weight %) | | | |
| Polyethylene | 30 | 20 | 20 |
| Liquid Paraffin | 70 | 80 | 80 |
| Draft Ratio[(6)] | 10 | 5 | 30 |
| Formability into Sheet[(7)] | Good | Good | Good |
| Properties of Microporous Polyethylene Membrane | | | |
| Thickness ($\mu$m) | 65 | 59 | 45 |
| Porosity (%) | 58 | 71 | 68 |
| Air Permeability[(8)] | 70 | 24 | 20 |
| Average Pore Diameter[(9)] | 0.18 | 0.44 | 0.53 |

| | COMPARATIVE EXAMPLE | | | |
|---|---|---|---|---|
| | 1 | 2 | 3 | 4 |
| Polyethylene (weight %) | | | | |
| Polyethylene 1[(1)] | 100 | 40 | 50 | 0 |
| Polyethylene 2[(2)] | 0 | 60 | 0 | 0 |
| Polyethylene 3[(3)] | 0 | 0 | 0 | 0 |
| Polyethylene 4[(4)] | 0 | 0 | 50 | 100 |
| Mw (×10$^5$) | 25 | 14 | 13 | 2.3 |
| Mw/Mn[(5)] | 4 | 13 | 20 | 11 |
| Concentration of solution (weight %) | | | | |
| Polyethylene | 20 | 20 | 20 | 20 |
| Liquid Paraffin | 80 | 80 | 80 | 80 |
| Draft Ratio[(6)] | 10 | 9 | 9 | 8 |
| Formability into Sheet[(7)] | Poor | Fair | Fair | Fair |
| Properties of Microporous Polyethylene Membrane | | | | |
| Thickness ($\mu$m) | — | 51 | 44 | 49 |
| Porosity (%) | — | 70 | 66 | 64 |

TABLE 1-continued

| Air Permeability[8] | — | 15 | 264 | 950 |
|---|---|---|---|---|
| Average Pore Diameter[9] | — | 0.52 | 0.26 | 0.12 |

| | COMPARATIVE EXAMPLE | | |
|---|---|---|---|
| | 5 | 6 | 7 |
| Polyethylene (weight %) | | | |
| Polyethylene 1[1] | 15 | 15 | 15 |
| Polyethylene 2[2] | 0 | 0 | 0 |
| Polyethylene 3[3] | 85 | 85 | 85 |
| Polyethylene 4[4] | 0 | 0 | 0 |
| Mw(×10⁵) | 7.0 | 7.0 | 7.0 |
| Mw/Mn[5] | 16 | 16 | 16 |
| Concentration of solution (weight %) | | | |
| Polyethylene | 20 | 20 | 45 |
| Liquid Paraffin | 80 | 80 | 55 |
| Draft Ratio[6] | 1.5 | 60 | 10 |
| Formability into Sheet[7] | Good | Fair | Poor |
| Properties of Microporous Polyethylene Membrane | | | |
| Thickness (μm) | 66 | 34 | — |
| Porosity (%) | 70 | 67 | — |
| Air Permeability[8] | 110 | 234 | — |
| Average Pore Diameter[9] | 0.35 | 0.51 | — |

Note:
[1]Weight-average molecular weight $2.5 \times 10^6$.
[2]Weight-average molecular weight $7.8 \times 10^5$.
[3]Weight-average molecular weight $3.0 \times 10^5$.
[4]Weight-average molecular weight $2.3 \times 10^5$.
[5]Weight-average molecular weight Mw/number-average molecular weight Mn.
[6]Cross-section area of die lip orifice/cross-sectional area of gel-like sheet.
[7]Formability of polyethylene solution into sheet.
[8]Unit: second/100 cc.
[9]Unit: μm.

As is evident from Table 1, the microporous polyethylene membranes of Examples 1–7 prepared according to the method of the present invention have comparatively large pore diameters and excellent permeability with good formability into sheets. On the contrary, in Comparative Example 1 using only polyethylene having too large a weight-average molecular weight Mw, the resultant polyethylene solution was so viscous that melt-blending was difficult, failing to provide a good microporous membrane.

In Comparative Examples 2 and 3 using a polyethylene composition having too large a weight-average molecular weight Mw as a whole, the resultant polyethylene solution was so viscous that the surface smoothness of the resultant microporous membrane was poor with irregular membrane thickness. Particularly in Comparative Example 3 using a polyethylene composition containing too large a percentage of a low-molecular weight component, the resultant microporous polyethylene membrane had high air permeability and low permeability (small average pore diameter).

In Comparative Example 4 using only polyethylene having too small a weight-average molecular weight Mw, the resultant microporous polyethylene membrane had extremely high air permeability and low permeability. Also, the polyethylene solution had such a low viscosity that it was not well formed into a sheet.

In Comparative Example 5 using too low a draft ratio, the resultant microporous polyethylene membrane had a small average pore diameter, large air permeability and low permeability. Conversely, in Comparative Example 6 using too large a draft ratio, the resultant microporous polyethylene membrane had a large average pore diameter and large air permeability, indicating that pores were occluded. In addition, the membrane had an irregular thickness. In Comparative Example 7, the polyethylene solution was so concentrated and viscous that forming it into a sheet was difficult.

Applications in Industry

As described above in detail, a microporous polyolefin membrane is produced by the method of the present invention comprising extruding a polyolefin solution through a die lip; uniaxially stretching the extruded polyolefin solution in a molten state without generating frost lines and gelation during solidification; and then cooling the sheet to solidify to a gel-like sheet by cooling rollers. Accordingly, the microporous polyolefin membrane has a large pore diameter, showing excellent permeability. The microporous polyolefin membrane obtained by the method of the present invention is suitable for various applications such as battery separators, separators for electrolytic capacitors, various filters, moisture-permeable, water-proof clothes, filtration membranes for reverse osmosis, ultrafiltration membranes, microfiltration membranes, etc., particularly for battery separators and microfiltration membranes requiring high permeability. In addition, the method of the present invention can produce the microporous polyolefin membrane at a high speed, providing extremely high production efficiency.

What is claimed is:

1. A method for producing a highly permeable microporous polyolefin membrane comprising the steps of:

preparing a polyolefin solution comprising 5–40 weight % of a polyolefin composition and 95–60 weight % of a solvent, said polyolefin composition having a weight-average molecular weight of not less than $3 \times 10^5$ and less than $1 \times 10^6$ containing 2 or more polyolefins each having a weight-average molecular weight of $1 \times 10^4$ to $6 \times 10^6$ and a weight-average molecular weight/number-average molecular weight of 5–300 as a whole;

extruding said polyolefin solution to yield an extrudate;

uniaxially stretching the extrudate in a molten state at a draft ratio of 3–50 at a distance of 10–50 mm between a die lip and a cooling roll before gelation of said extrudate starts to yield a stretched polyolefin extrudate;

cooling the stretched polyolefin extrudate to solidify to a gel-like sheet by said cooling roll kept at a temperature between 30° C. and the crystallization temperature of said extrudate, to produce said gel-like sheet;

removing a residual solvent from said gel-like sheet and drying the resultant sheet to yield a dried sheet; and heat-setting said dried sheet at a temperature range between 80° C. and the melting point of the resultant sheet; whereby said highly permeable microporous polyolefin membrane having a permeability of 70 second/100 cc or less is obtained.

2. The method for producing a highly permeable microporous polyolefin membrane as claimed in claim 1, wherein said polyolefin composition contains a polyolefin having a weight-average molecular weight of $1 \times 10^6$ to $6 \times 10^6$ and a polyolefin having a weight-average molecular weight of $1 \times 10^4$ to less than $1.0 \times 10^6$.

3. The method for producing a highly permeable microporous polyolefin membrane as claimed in claim 2, wherein the content of said polyolefin having a weight-average molecular weight of $1\times10^6$ to $6\times10^6$ is 5–35 weight % per 100 weight % of the polyolefin composition as a whole.

4. The method for producing a highly permeable microporous polyolefin membrane as claimed in claim 1, wherein said extrudate is drawn in a molten state by cooling rolls at a rate of 20 cm/minute–15 m/minute, whereby said extrudate is uniaxially stretched.

5. The method for producing a highly permeable microporous polyolefin membrane as claimed in claim 1, wherein the microporous polyolefin membrane has a porosity of 35–95%.

6. The method for producing a highly permeable microporous polyolefin membrane as claimed in claim 1, wherein the microporous polyolefin membrane has an average pore diameter of 0.05–1 $\mu$m.

* * * * *